J. SELWIG.
CENTRIFUGAL MACHINE.
APPLICATION FILED NOV. 23, 1904.
1,046,340.
Patented Dec. 3, 1912.
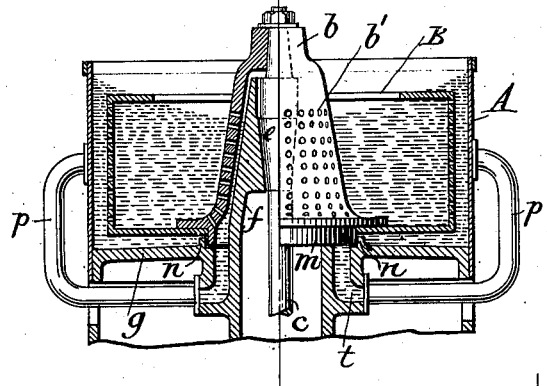
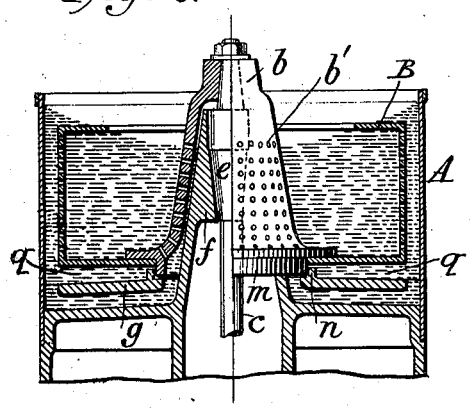
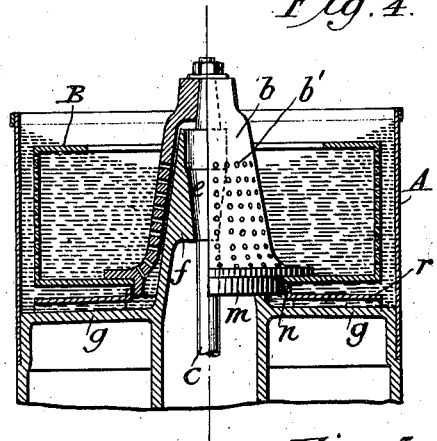
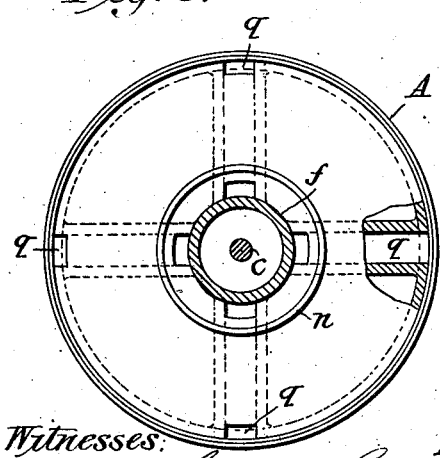
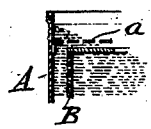
Witnesses:
Inventor:
Johannes Selwig,

UNITED STATES PATENT OFFICE.

JOHANNES SELWIG, OF BRUNSWICK, GERMANY.

CENTRIFUGAL MACHINE.

1,046,340.  Specification of Letters Patent.  Patented Dec. 3, 1912.

Application filed November 23, 1904. Serial No. 234,005.

*To all whom it may concern:*

Be it known that I, JOHANNES SELWIG, a subject of the German Emperor, residing at Brunswick, in the German Empire, Petrithorwall 24, have invented a new and useful Improvement in Centrifugal Machines, of which the following is a specification.

My invention relates to improvements in apparatus hitherto employed for producing a fluid circulation in a centrifugal machine with a casing closed at the bottom, for the purpose of bringing the substance contained in the perforated basket of the machine in intense and repeated contact with the fluid filling the casing.

In centrifugal machines of the class to which my invention relates, and frequently employed in dyeing, nitrating, lixiviating, dissolving, filtering and similar operations, the substance under treatment is first treated with the fluid by the circulation of the latter while the basket revolves slowly; the fluid is then discharged and the machine put in rapid motion for freeing the substance from the fluid by centrifugal force.

In the accompanying drawing, Figure 1 is a view, mainly in vertical section, showing my improvement. Fig. 2 is a similar section of a modification. Fig. 3 is a plan, partly in section, of Fig. 2, certain portions being removed. Fig. 4 is a view, chiefly in vertical section, showing a further modification of my invention. Fig. 5 is a plan view, partly in section, of Fig. 4, certain parts being removed. Fig. 6 is a fragmentary view in vertical section showing a modification.

Similar letters of reference indicate similar parts in the respective figures.

Referring more especially to Fig. 1, a vertical section of a centrifugal machine is shown, having an improved fluid circulation apparatus. In this form of my invention the fluid-circulation is caused by slow rotation of the basket.

A is the cylindrical casing of the machine, which is closed below so that it may be filled with any fluid.

B is a perforated basket which is charged with the substance under treatment, the basket being carried by a conical dome $b$ fixed to the top of the central shaft $c$ which revolves in stationary bearings, and is fitted below with a driving pulley (not shown) for putting the machine in motion.

The neck-bearing $e$ of the shaft $c$ is placed in a conical bracket $f$ partly occupying the interior of the dome $b$, and forming the center-piece of the bottom $g$ of the casing A, the upper edge of said basket projecting above the surface of the fluid when the casing is filled therewith. Between the walls of the conical dome $b$ and the bracket $f$ is left sufficient space for the passage of the circulating fluid, and the walls of the dome are provided with a number of perforations $b'$ for the direct connection of the interior of the dome with the interior of the perforated basket B.

The interior of the dome $b$ is separated from the space between the bottom $g$ of the casing and the bottom of the basket B, as shown for example in Fig. 1, by an annular rim $m$ connected below with the bottom of the basket, the rim $m$ being surrounded by a corresponding annular rim $n$ projecting over a shoulder on the bottom $g$ of the casing.

As the rim $m$ revolves with the basket B, it must not touch the rim $n$, but a small space is left between them. For returning the fluid to the interior of the dome $b$ the latter is connected in a suitable way with the interior of the casing A at its circumference, for instance as shown in Fig. 1, by one or more pipes $p$ leading from the outside wall of the casing to two knee-shaped conduits $t$ communicating with the interior of the dome $b$; or as shown in Figs. 2 and 3, by four conduits $q$ leading under the bottom of the casing from the foot of the bracket $f$ to the wall of the casing. Figs. 4 and 5 represent a modification serving the proposed purpose, in which is used an annular metal-plate $r$, the exterior diameter of which is less than the exterior diameter of the casing, the plate $r$ being fixed to the bottom $g$ of the latter, some space being left between the bottom $g$ and the plate $r$ for the passage of the fluid. The inner edge of the plate $r$, which is bent upward, borders upon the annular rim $m$ so that the interior of the dome $b$ on the one hand is separated by the plate $r$ from the space under the basket, while on the other hand it is directly connected by the space between the bottom $g$ and the plate with the interior of the casing A near its wall.

Now it is clear that when the casing is filled to any height with a fluid, whether this fluid rotate within the casing or not, the pressure of the fluid within the dome $b$ at a certain height will be equal to the pressure of the fluid at the circumference of the casing at the same height, as the spaces communicate one with the other in the above described manner. When the basket B is at rest, and with it the fluid contained in the casing A, the surface of the fluid will form a horizontal plane, and for this reason the fluid-pressure at a certain height will be the same throughout; whereas, when the basket rotates, and with it the fluid contained in it and the space surrounding it, the surface of the fluid will sink near the center of the casing and rise at the circumference thereof. Consequently the fluid-pressure in the center of the basket will be less than that near the circumference of the casing. Now this greater fluid-pressure is transferred in the above described way to the interior of the dome $b$, and as it exceeds the fluid-pressure within the basket, the fluid will flow out of the interior of the dome $b$ through the perforations $b'$ into the interior of the basket which it traverses in a radial direction. Then it will pass the exterior perforated wall of the basket B and under the space surrounding it, whence it will run back through the pipes, conduits or any other existing passages to the interior of the dome $b$. Accordingly the fluid will circulate through the basket B and the substance contained therein, and this circulation will continue as long as the basket rotates. The strength of the circulation will depend upon the number of revolutions of the basket.

For preventing the circulating fluid from flowing over the upper edge of the casing A when the basket B is rapidly rotated, a horizontal cover $a$ may be fixed (see Fig. 6) above the basket to the wall of the casing, under which cover the fluid may circulate. The cover, a section only of which is shown, is a perforated flat plate, by means of which the force of the fluid passing therethrough is broken, the fluid being therefore kept from dashing over the edges of the casing A. As this will have no influence upon the fluid-pressure within the casing, the circulation will take place in the same way as in an open casing.

The advantages of the fluid-circulation arrangement forming the subject of this invention are that it takes place throughout under the surface of the fluid, and that it is immaterial whether the basket is filled with fluid up to the top or to any other height.

Having thus described my invention, I claim:

1. In a centrifugal machine, the combination of a casing having a bottom provided with an annular rim $n$, a laterally perforated basket having a laterally perforated central dome secured thereto and provided with an annular rim $m$, the latter being concentric with and adjacent to said annular rim $n$, a space being left between the dome and the bracket, and spaces being left between said basket and the casing and between the said rims, a driving shaft passing through the bracket and secured to the dome of the basket, and means whereby communication is had between the interior of the casing and the interior of the dome, substantially as set forth.

2. In a centrifugal machine, the combination of a casing having a bottom provided with an annular rim $n$, a laterally perforated basket having a laterally perforated central dome secured thereto and provided with an annular rim $m$, the latter being concentric with and adjacent to said annular rim $n$, a space being left between the dome and the bracket, and spaces being left between said basket and the casing and between the said rims, a driving shaft passing through the bracket and secured to the dome of the basket, an annular cover affixed to the casing above the top of the basket, and means whereby communication is had between the interior of the casing and the interior of the dome, substantially as set forth.

JOHANNES SELWIG.

Witnesses:
CARL BOEHME,
JACOB KÖRNER.